United States Patent [19]

Taube et al.

[11] Patent Number: 4,532,634

[45] Date of Patent: Jul. 30, 1985

[54] ELECTRODE FOR ELECTRIC ARC FURNACES

[75] Inventors: Thomas Taube, Erlangen-Steudach; Inge Lauterbach-Dammler, Nuremberg, both of Fed. Rep. of Germany

[73] Assignee: ARC Technologies Systems Ltd., Cayman Islands, British West Indies

[21] Appl. No.: 531,921

[22] Filed: Sep. 13, 1983

[30] Foreign Application Priority Data

Sep. 13, 1982 [CH] Switzerland ............... 5412/82

[51] Int. Cl.³ .............................. H05B 7/07
[52] U.S. Cl. .................................. 373/93; 373/92; 373/102
[58] Field of Search .......... 266/86; 373/90, 91, 373/92, 93, 102, 104

[56] References Cited

U.S. PATENT DOCUMENTS 3,610,601 10/1971 Bishop, Jr. ............... 266/86 X
3,636,228 1/1972 Comentz ................. 13/12
3,741,557 6/1973 Harbaugh et al. ......... 266/86 X
4,121,042 10/1978 Prenn ..................... 373/93

FOREIGN PATENT DOCUMENTS 1048649 1/1959 Fed. Rep. of Germany .
2743029 4/1978 Fed. Rep. of Germany .
2951121 11/1982 Fed. Rep. of Germany .

Primary Examiner—Reinhard J. Eisenzopf
Attorney, Agent, or Firm—John J. Freer

[57] ABSTRACT

An electrode for arc furnaces, comprising a metallic water-cooled upper section and a consumable, replaceable lower section, interconnected by means of a threaded nipple or the like. At least one light-receiving element is positioned in a zone associated with the interconnection of the cooled metal shaft and the consumable section. A light signal falling on the light-receiving element where the consumable section is in absence, is passed in a suitable manner via a light wave guide to a furnace control which activates a safety system.

14 Claims, 2 Drawing Figures

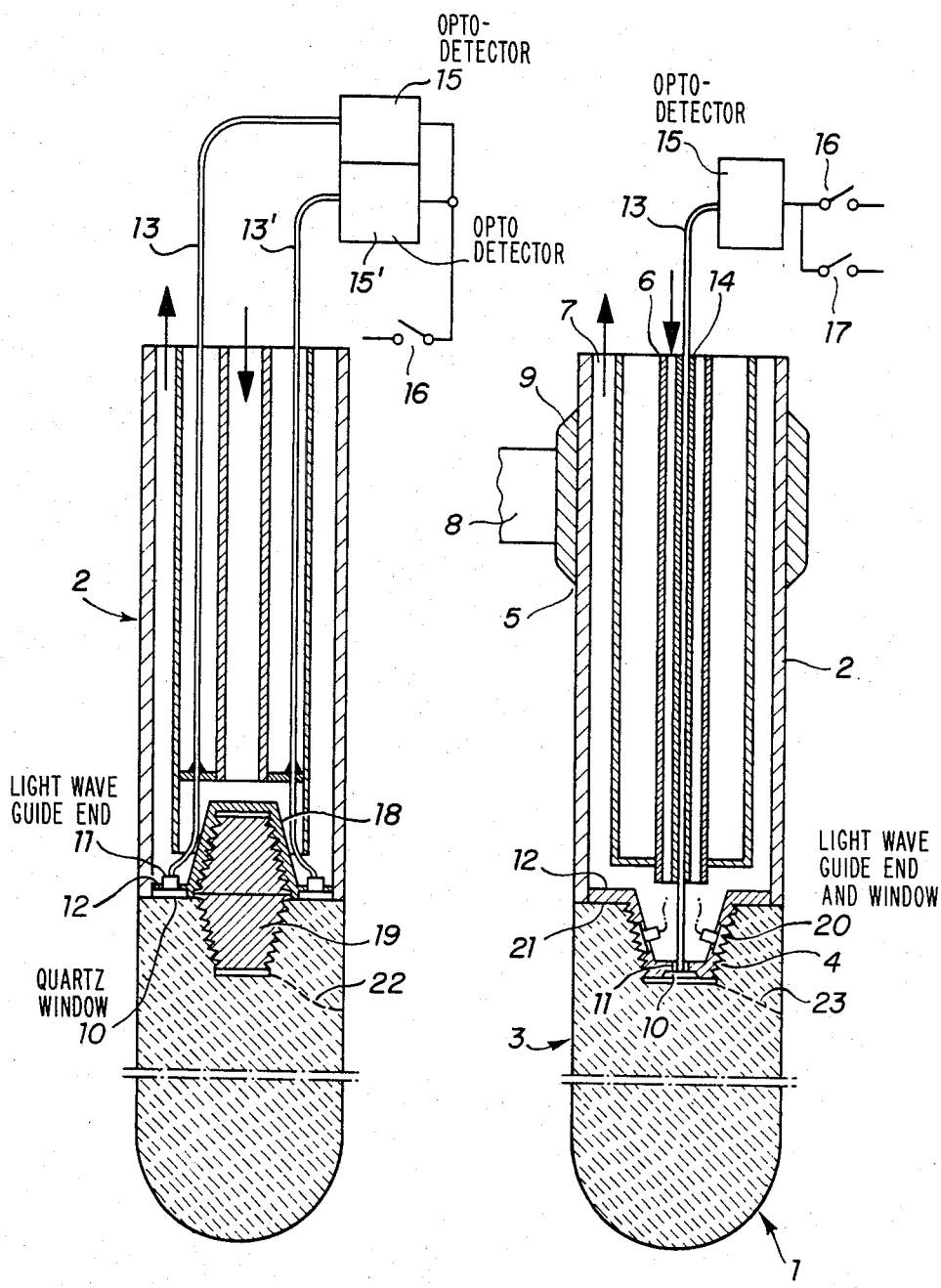

ELECTRODE FOR ELECTRIC ARC FURNACES

FIELD OF THE INVENTION

This invention relates to electrodes for arc furnaces, having water-cooled metallic upper sections and a lower section of a consumable material, so called wearing sections, which are interconnected by means of a threaded nipple or the like. Such electrodes are used in the production of steel.

BACKGROUND OF THE INVENTION

In conventional steel production by means of electric arc furnaces, graphite or carbon electrodes employed for arc striking are consumed not only adjacent a lower end, where the arc is drawn or struck, but, also longitudinally along the periphery of the wearing section, generally as a result of the heat in the interior of the furnace. As a consequence, the electrode is consumed in such a way that a generally conical shape results at the lower end. The resulting reduction in diameter leads to a faster consumption of material at the electrode tip. In addition, due to strong vibration and a generally rough environment in the interior of the furnace, the tapering of the diameter of the wearing section causes ends of the electrode to break off precipitously. The resulting elevated consumption of wearing sections contributes to elevating costs incurred per ton of steel produced.

To avoid such disadvantages different types of electrodes have been developed, the metallic portion being coated with a protective layer or being water-cooled.

Water-cooled electrodes are known from, for example, DE-AS 2 430 817 and DE-AS 2 739 483. Such electrodes essentially comprise a water-cooled metallic upper section and a lower section of a consumable material, a so called wearing section generally made of graphite or carbon. The sections are often interconnected by means of a threaded nipple or the like. In the upper metal section or shaft, such electrodes include supply and return ducts for cooling water. The ducts may be grouped and interconnected or may comprise a central supply duct and a ring-shaped outer return duct. Such ducts generally approach a front or lower face of the metal shaft which borders on the wearing section, thus providing generally satisfactory cooling of this zone of interconnection. As a result, certain advantages are obtained, such as uniform temperatures in a peripheral direction with respect to the electrode, and an acceptable thermal balance in case of slight thermal stresses.

A further advantage is that the replacement of the consumed lower section by a new section does not involve any difficulties arising from material distortions attributable to excessively elevated temperatures in the region of the interconnection. Additionally, sealing between the electrode and an opening in the arc furnace cover through which the electrodes is inserted, does not generally promote major problems, due at least in part to the cross-section of the upper electrode section being relatively unchanged for lack of wear and tear and/or side oxidation.

Where such conventional water-cooled electrodes are employed, it is however, possible that the loss of the wearing section on account of external influences, such as traumatic scrap movement, vibration, uneven pressure, or the completely unnoticed consumption of the wearing section can lead to the development of an electric arc between the metal section or shaft and the broken tip of the wearing section and/or molten metal within the furnace, which can lead to the destruction of the water-cooled metal shaft. Apart from the fact that the destruction of the metal shaft is costly, as replacement by a spare shaft is required, generally inventoried, damage to the metallic section can pose great danger for the operating personnel and the furnace plant as a whole, since cooling water may pass from the destroyed metal section into the molten metal triggering a violent release of steam.

European patent application No. 0 012 573 (British Steel) describes a water-cooled electrode in which an inert gas is purged under pressure via appropriate ducting within the metal shaft or section, essentially in an axial direction, to the zone of interconnection between the metal shaft and the wearing section. If the consumable section is securely fastened and not defective, a relatively constant gas pressure will build up in the interconnection zone. A pressure drop may serve as a signal indicating that the active or wearing and metallic sections have broken contact, or that there must have been a major consumption or some other disruption to the connection between the two sections. One disadvantage to such an electrode is, however, that considerable, uncontrollable pressure losses may not produce clear signals, attributable generally to firstly, the contact areas of the two sections not being completely even and coplanar and, secondly, graphite being a porous material, which means that reliable sealing of the gas can be difficult. Thus it may be possible that the gas pressure registered within the interconnection zone can vary from electrode to electrode or even within the same electrode, depending on factors such as the type of consumable section being employed and its configuration.

Furthermore, on account of the fact that the gas monitoring duct is centrally located it is difficult to detect a partial fracture or one-sided consumption. Moreover, the signal obtained is an essentially a constantly rising curve, generally permitting only a delayed reaction to the signal.

Due to such a delay, the command for the interruption of the current supply and the removal of the electrode would also be delayed, opening the door to destruction of the metal shaft and thus a potential escape of coolant into the furnace.

OBJECT OF THE INVENTION

The object of the present invention is to develop a water-cooled electrode for arc furnaces producing a reliably clear signal, should the consumable or wearing section break or somehow become damaged or destroyed. Such a signal should make it possible to remove a damaged electrode from the furnace rapidly and without prejudical delay in order to avoid danger to personnel and plant. Such an electrode should have a simple design and should neither be affected by substantially elevated temperatures nor by electric and magnetic fields significantly.

The present invention provides an electrode for electric arc furnaces which having a water-cooled metallic upper section or shaft and a replaceable, consumable or wearing section interconnected by a threaded nipple or the like. At least one light-receiving element is positioned in the interconnection zone between the cooled metal shaft and the wearing section. This light-receiving element may be a single element which is located centrally in the interconnection zone, or may include a plurality of light-receiving elements in the interconnection zone between the two electrode sections. In accordance with the invention, in the event of a loss of or significant damage to the consumable section the light associated with the intensity of the molten metal within the furnace provides a signal indicating the destruction of the electrode. Such light signals are highly advantageous, immediately indicating a change from dark to light as a no/yes message, a clear signal that can be rapidly translated by control hardware associated with the furnace. In case of the destruction of the wearing section, the whole furnace may be switched off, for example, by means of an emergency switch, with the electrode being removed from the dangerous zone by automatically activating an operating lifting contrivance associated with the furnace. Thus it is neither possible that an electric arc develops between the metal shaft and either the wearing section that has broken off or the molten metal, nor is it possible that cooling water can leak through a damaged metal shaft into the molten metal. In this way the furnace is protected and operating personnel are exposed to a reduced operating danger. The arrangement of a plurality of light-receiving elements in an essentially concentric manner within the interconnection zone has the further advantage in that if only a part of the wearing section breaks or where the wearing section is consumed on one side only, at least one of the light-receiving elements located near the resulting exposure will produce a signal, less likely where employing a single light-receiving element arranged centrally.

It is advantageous for the light-receiving element to be an optical system of glass having an attached light wave guide with a front face reaching into the interconnection zone between the two electrode sections. Any suitable or conventional light wave guide may be used, including synthetic, glass, or quartz fibre guides. Glass or quartz fibre guides are preferred generally as having higher heat resistance, but the advantage to fibre guides is ease of fastening and ductility, passing easily through or around obstructions without the necessity for form bending of the light guides, which may otherwise considerably reduce the transmission of a light signal.

It is useful to lead the light wave guides in the interior of the metal shaft essentially parallel to the axis of the shaft in such a manner that they protrude beyond the top of the electrode, for a plurality arrangement, each light wave guide is preferably routed separately up the cooled metal shaft, or equally preferably the guides are gathered at the lower end of the metal shaft, exiting the electrode as a single fibre guide bundle. A central, bundled arrangement of the guides is also advantageous in permitting a simple design for the electrode section.

It may be advantageous to connect guides used as light-conducting elements to a detector outside the electrode for transduction of a light signal into an electrical signal; so-called opto-detectors being useful for this purpose. Where a plurality of light wave guides are employed in the interconnection zone, it is possible to connect each light wave guide to a separate such opto-detector, each detector transducing a received light signal into an electrical signal thereby providing a form of fail safe backup. Alternately, a plurality of single light wave guides can jointly feed a single opto-detector or can be connected to fibre guides of the same type already bundled in the interior of the electrode section, and joined to a single opto-detector.

Advantageously the face of the metal shaft adjacent a detection opening of the light wave guide may include a quartz glass window configured in to shield optical system detection opening against temperature, gases and other harmful influences. Any suitable or conventional shielding method will suffice, for example, quartz glass may be glued into a suitable round opening of a somewhat larger diameter than a bore receiving the light guide or fastened by other conventional means, or the quartz glass may be inserted adjacent the face of the metal shaft from the interior of the electrode. The respective light wave guide is connected to the glass optical system in a conventional manner, and fastened behind the quartz window in such a manner that light incidence is optimal. The other end of the light wave guide is connected to the opto-detector in a conventional manner, e.g., the end of the guide is polished and oriented to the photodiode contained in the detector.

The opto-detector generally is configured to trigger a logic element, which typically may be a relay, or the opto-detector may produce a TTL-CMOS compatible output level which is passed on to a process computer controlling the furnace. The fact that the furnace plant is equipped with an emergency switch for switching off all operations, is very useful; the entire power supply can be switched off by means of this single switch. Where the logic element associated with the detector is connected to this emergency switch for the furnace plant as well as to a contrivance for insertion and/or removal of the electrode, in such a manner that upon receipt of a light signal electrical current supply is switched off and the electrode is lifted from the interior of the furnace.

Moreover, to provide an even greater protection of the electrode, protective gas may be blown around the exposed metal shaft, upon receipt of a light signal.

BRIEF DESCRIPTION OF THE DRAWINGS

The invention will be described in greater detail in connection with the accompanying drawings in which:

FIG. 1 is an axial section of an electrode including a single light-receiving element.

FIG. 2 is an axial section of an electrode including a plurality of light-receiving elements.

DETAILED DESCRIPTION OF THE DRAWINGS

FIG. 1 shows a composite electrode 1, having an upper metallic section including a metal shaft 2, and a replaceable lower section of a consumable material or wearing section 3. At its face, the metal shaft 2 has a protuberance with the shape of a threaded nipple that fits into a respective threaded bore of the wearing section 3. The metal shaft 2 essentially comprises a cylinder-shaped sheath 5, having a central coolant supply duct 6 and an outer ring-shaped coolant return duct 7 positioned in a concentric manner. Cooling water enters the metal shaft at the center through the supply duct 6 and flows back through the outer ring-shaped return duct 7 flushing the sheath 5 from the inside, and providing cooling of the metal sheath. The electrode 1 is positioned by a support arm 8 equipped including a holder, with the support arm being connected to suitable or conventioned contrivance (not shown) for the insertion and/or removal of the electrode from the furnace in an axial direction. The electrode includes contact jaws 9. Electric current required for the production of an electric arc passes from the support arm 8 to the electrode via these contact jaws. Essentially in the center of the lower face of the metal shaft 2, i.e. in the front wall of the nipple 4, there is a fused quartz window 10, having a lower area basically coinciding with the face of the nipple. A light wave guide 13 is positioned above the fused quartz window, connected to an optical system of glass, positioned in an appropriate bore of the face of the nipple 4. The light wave guide 13 is protected by a pipe 14, and passes from the interior of the electrode, and is connected to an opto-detector 15.

The detector 15 in turn, or a logic element associated therewith or a triggered control unit associated therewith is connected to an emergency switch 16 of the furnace plant by which the electrical current supply to the electrode may be interrupted. In the presence of an enabling light signal, the electrode is withdrawn from the interior of the furnace employing this emergency switch 16 or optionally employing a second switch 17 for the hydraulic insertion or removal of the electrode, advantageously operated by the same logic element of the detector 15 as the emergency switch 16.

Referring to FIG. 2, the electrode includes an indentation in the form of a threaded ring which is located at the center of the lower face of the metal shaft 2. One half of a nipple 19 is screwed into the thread of this ring, while the other half is screwed into the face of the consumable section 3. In the ring-shaped lower face 12 adjacent the threaded ring 18 a plurality of glass optical systems having light wave guides 13 positioned in respective bores parallel to an axis of the electrode are located behind individual quartz windows in a ring-like manner about the axis of the electrode. The light wave guides 13 each communicate with detectors 15, in turn connected to an emergency switch 16.

Alternately, the ends 11 of the light wave guides 13 may, with or without protective fused quartz windows 10 also be positioned in a position designated by the reference numeral 20 as shown in FIG. 1 in the threaded nipple, preferably a plurality of sensors 20 being distributed over the periphery.

The described electrode, particularly its system of signals, functions as follows: If, as a result of external influences the consumable section breaks above the lower face of nipple 4 or in the connection area 21 between front face of wearing section 3 and lower face 12 of metal shaft 2, light will fall on the lower face of the nipple and thus through the quartz window 10 on the optical system of glass for transmission to the light wave guide 13 for transmission to the opto-detector 15. In the opto-detector the light falls directly or indirectly on to a photodiode, which produces an electric current that operates the emergency switch 16 either directly via a relay or equally preferable via a computer-compatible signal and a process computer. As a result, the entire current supply of the furnace plant and/or the electrode 1 is switched off, while the hydraulic or electro-mechanical system for the withdrawal of the electrode 1 from the interior of the furnace is triggered.

If the electrode breaks generally along a dashed line 22 as shown in FIG. 2, ends of the light wave guides, now exposed, will take up light and pass the light to the opto-detector(s), which results in a switch-off of the entire plant. In case of a break generally along a line 23 as shown in FIG. 1 light can only be received if the light wave guides are located as shown by reference number 20, the single guide attached to the lower face of the nipple being unable to generate a signal, demonstrating the advantage of a plurality of light wave guides positioned as far as possible towards the outside of the interconnection zone.

What is claimed is:

1. An electrode for arc furnaces, comprising a metallic upper section and a replaceable, consumable lower section and an interconnection means, said electrode including at least one light-receiving element internally positioned within said electrode upper section or interconnection means and in face-to-face relationship with said lower section.

2. The electrode of claim 1, wherein several light-receiving elements are positioned circumferentially about an electrode axis in a ring-like manner.

3. The electrode of claims 1 or 2, the light-receiving element constituting an optical system of glass having one surface facing said lower electrode section and protected by a fused quartz window.

4. The electrode of claim 1 or 2, having an optical system including a light wave guide.

5. The electrode as claimed in claim 4, wherein said light wave guide is positioned in the interior of the metallic upper section, protruding beyond the top of the electrode and being connected to an opto-detector positioned outside the electrode.

6. The electrode of claim 5, including a plurality of light wave guides, each guide being connected to a separate opto-detector.

7. The electrode of claim 6, said light wave guides being passed in a bundle to a single opto-detector.

8. The electrode of claim 5, the opto-detector having a TTL-CMOS compatible output.

9. A method for detecting a damage incident to a lower portion of an arc electrode having a metallic upper portion and a consumable, replaceable lower portion including an interconnection zone between the portions, comprising: positioning at least one light-receiving element within said upper portion or interconnection zone and in face-to-face relationship with said lower portion, and connecting the light-receiving element to an opto-detector to provide an indication of receipt of light from the light-receiving element.

10. The method of claim 9, wherein said light receiving element and opto-detector are connected with a light wave guide.

11. THe method of claim 10, wherein said light wave guide is positioned in the interior of the metallic upper portion and protrudes beyond the top of the electrode, with said guide being connected to an opto-detector positioned outside the electrode.

12. The method of claim 11, wherein said light wave guide is connected to an opto-detector having a TTL-CMOS compatible output.

13. The method of claim 10, including connecting a plurality of light wave guides, each guide being connected to a separate opto-detector.

14. The method of claim 10 including connecting a plurality of light wave guides in a bundle to a single opto-detector.

* * * * *